United States Patent
He et al.

(10) Patent No.: US 10,354,122 B1
(45) Date of Patent: Jul. 16, 2019

(54) USING MASKS TO IMPROVE CLASSIFICATION PERFORMANCE OF CONVOLUTIONAL NEURAL NETWORKS WITH APPLICATIONS TO CANCER-CELL SCREENING

(71) Applicant: Hong Kong Applied Science and Technology Research Institute Company Limited, Hong Kong (HK)

(72) Inventors: Xuejian He, Hong Kong (HK); Lu Wang, Hong Kong (HK)

(73) Assignee: Hong Kong Applied Science and Technology Research Institute Company Limited, Hong Kong (HK)

(*) Notice: Subject to any disclaimer, the term of this patent is extended or adjusted under 35 U.S.C. 154(b) by 14 days.

(21) Appl. No.: 15/910,131

(22) Filed: Mar. 2, 2018

(51) Int. Cl.
*G06K 9/00* (2006.01)
*G06K 9/62* (2006.01)
*G06T 7/00* (2017.01)
(Continued)

(52) U.S. Cl.
CPC ....... *G06K 9/00147* (2013.01); *G06K 9/4628* (2013.01); *G06K 9/6257* (2013.01);
(Continued)

(58) Field of Classification Search
CPC ............. G06K 9/00147; G06K 9/4628; G06K 9/6257; G06K 7/0012; G06K 9/6268;
(Continued)

(56) References Cited

U.S. PATENT DOCUMENTS 6,463,438 B1   10/2002   Veltri et al.
6,754,380 B1    6/2004   Suzuki et al.
(Continued)

FOREIGN PATENT DOCUMENTS

CN   106780466 A   5/2017
CN   106991673 A   7/2017
CN   103984958 B   11/2017
WO   2015054666 A1   4/2015
(Continued)

OTHER PUBLICATIONS

E. Teng et al., "ClickBAIT: Click-based Accelerated Incremental Training of Convolutional Neural Networks," arXiv:1709.05021v1, [cs.CV], Sep. 15, 2017 (Cornell University Library).
International Search Report and Written Opinion of PCT application No. PCT/CN2018/078484 issued from the International Search Authority dated Nov. 23, 2018.

*Primary Examiner* — Tom Y Lu
(74) *Attorney, Agent, or Firm* — Spruson & Ferguson (Hong Kong) Limited

(57) ABSTRACT

In cancer-cell screening, a patient's cells are classified by a convolutional neural network (CNN) to identify abnormal cells. In one approach, a mask having a center more transparent than the mask's periphery is used to mask an input image containing a cell of interest to yield a masked image. Since the cell is usually located around an image center, and since the image often contains irrelevant objects, such as normal cells and micro-organisms, around an image periphery, interference due to the irrelevant objects in training the CNN and in classification is diminished by using the masked image rather than the original one. In another approach, masking is applied to feature maps before classification. In the CNN, this masking is accomplished by convolving each feature map with a convolutional kernel to produce an intermediate feature map followed by chopping off a peripheral region thereof to yield a downsized feature map.

20 Claims, 13 Drawing Sheets

(51) Int. Cl.
*G06T 7/187* (2017.01)
*G06K 9/46* (2006.01)
*G06T 7/11* (2017.01)

(52) U.S. Cl.
CPC .......... *G06K 9/6268* (2013.01); *G06T 7/0012* (2013.01); *G06T 7/11* (2017.01); *G06T 7/187* (2017.01); *G06T 7/97* (2017.01); *G06T 2207/10056* (2013.01); *G06T 2207/20081* (2013.01); *G06T 2207/20084* (2013.01); *G06T 2207/30024* (2013.01)

(58) Field of Classification Search
CPC ... G06T 7/11; G06T 7/187; G06T 7/97; G06T 2207/20081; G06T 2207/20084; G06T 2207/30024; G06T 2207/10056
See application file for complete search history.

(56) References Cited

U.S. PATENT DOCUMENTS

| | | |
|---|---|---|
| 9,514,389 B1 | 12/2016 | Erhan et al. |
| 9,739,783 B1 | 8/2017 | Kumar et al. |
| 2015/0036920 A1 | 2/2015 | Wu et al. |
| 2017/0169567 A1 | 6/2017 | Chefd'hotel et al. |
| 2018/0114317 A1* | 4/2018 | Song .................. G06K 9/6265 |
| 2018/0137338 A1* | 5/2018 | Kraus ................. G06K 9/6259 |
| 2018/0292784 A1* | 10/2018 | Nguyen ............... G03H 1/0005 |
| 2019/0034557 A1* | 1/2019 | Alsallakh ............. G06F 16/583 |

FOREIGN PATENT DOCUMENTS

WO 2017134519 A1 8/2017

* cited by examiner

USING MASKS TO IMPROVE CLASSIFICATION PERFORMANCE OF CONVOLUTIONAL NEURAL NETWORKS WITH APPLICATIONS TO CANCER-CELL SCREENING

LIST OF ABBREVIATIONS

ADC adenocarcinoma endocervical
AGC atypical glandular cell
AIS adenocarcinoma in-situ
ASC-H atypical squamous cell-cannot exclude HSIL
ASC-US atypical squamous cell of undetermined significance
CNN convolutional neural network
HSIL high-grade squamous intraepithelial
LSIL low-grade squamous intraepithelial
SCC squamous cell carcinoma
TBS the Bethesda system
WSI whole slide image

FIELD OF THE INVENTION

The present invention relates generally to a method for improving performance of CNNs in classification of cells. More particularly, the present invention relates to a method for improving classification performance of CNNs used in cancer-cell screening.

BACKGROUND

Cervical cancer is a cancer arising from a cervix of a female. The conventional way of cervical-cancer screening is to visually examine cervical cells on a slide through a microscope by a cytotechnologist to check for any cell showing signs of malignant changes. Typically, about 100,000 cells in a single sample are required to be examined. This examination process takes around 10-15 minutes and is thus time-consuming and costly.

To reduce time and cost, computer-aided automatic cancer screening is particularly useful. Due to a high accuracy in various image-classification tasks, a CNN has been used for automatic cervical-cancer screening, e.g., in U.S. Pat. No. 9,739,783 and CN106991673. However, training the CNN with adversarial samples has been shown to result in significant impairment of the CNN classification performance. Each adversarial sample is an image containing a cervical cell that is classified and labeled, and further including a number of irrelevant objects, such as a noisy background, irrelevant cells, micro-organisms, or even cells with opposite labels in the background. FIG. 1 is a real-life adversarial sample as an example for illustration. A training image 100, which is used for training a CNN, has an abnormal cell 110 as a principal pre-classified object for training the CNN. In the vicinity of the abnormal cell 110, there are nearby normal cells 120, 121 and micro-organisms 130, 131. The normal cells 120, 121 and the micro-organisms 130, 131 are irrelevant objects that interfere the training process of the CNN. These irrelevant objects could make the CNN learn incorrect features, thereby leading to misclassification.

It is desirable to have a technique that enhances the chance of successful classification of abnormal cells by a CNN in the presence of interfering irrelevant objects.

SUMMARY OF THE INVENTION

In the present invention, masks are advantageously used to enhance classification accuracy obtained by a CNN in classifying abnormal cells in the presence of interfering irrelevant objects.

A first aspect of the present invention is to provide a method performed by one or more computing processors for classifying a plurality of cells by using a CNN. An image-end masking approach is adopted in the method. The plurality of cells may be originally obtained from a cervix of a patient for cancer-cell screening or precancerous-abnormality screening.

In the method, a plurality of training images and a plurality of testing images are obtained. The plurality of training images is used for training the CNN. An individual training image contains one or more cells each pre-classified to belong to a cell type selected from a set of predetermined cell types. Each of the testing images contains a respective cell selected from the plurality of cells.

A mask is selected for masking the training and testing images. The mask has a transmittance function monotonically decreasing from a center of the mask to a periphery thereof such that the center of the mask is more transparent than the periphery thereof.

The individual training image is masked with the mask to form an individual masked training image so as to generate a plurality of masked training images. The CNN is trained with the plurality of masked training images. When the pre-classified one or more cells are located around a center of the individual training image and the individual training image further contains a first plurality of irrelevant objects located around a periphery of the individual training image, interference due to the first plurality of irrelevant objects in training the CNN is diminished by using the individual masked training image rather than the original individual training image.

Preferably, an individual testing image is also masked with the mask to form an individual masked testing image so as to generate a plurality of masked testing images. The plurality of cells is classified according to the set of predetermined cell types by processing the plurality of masked testing images with the CNN after training to yield a plurality of classification results. When the respective cell is located around the center of the individual testing image and the individual testing image further contains a second plurality of irrelevant objects located around a periphery of the individual testing image, interference due to the second plurality of irrelevant objects in classifying the respective cell is diminished by using the individual masked testing image rather than the original individual testing image.

A second aspect of the present invention is to provide a method performed by one or more computing processors for classifying a plurality of cells by using a CNN. A feature-end masking approach is adopted in the method. The plurality of cells may be originally obtained from a cervix of a patient for cancer-cell screening.

In the method, the CNN is configured to include a plurality of layers, a convolutional masking layer and a classifying layer. The plurality of layers is used for generating plural feature maps based on an input image received by the CNN. The convolutional masking layer is used for convolving a mask with each of the feature maps so as to generate plural downsized feature maps. The mask has an all-zero outermost region and a non-zero convolutional kernel. The outermost region has a uniform width in pixel. The classifying layer is used for generating a classification result according to the downsized feature maps.

In the method, a plurality of training images and a plurality of testing images are obtained. The plurality of training images is used for training the CNN. An individual training image contains one or more cells each pre-classified to belong to a cell type selected from a set of predetermined cell types. Each of the testing images contains a respective cell selected from the plurality of cells.

The CNN is trained with the plurality of masked training images, where the CNN receives each of the masked training images as the input image. The plurality of cells is classified according to the set of predetermined cell types by processing the plurality of masked testing images with the CNN after training to yield a plurality of classification results, where the CNN receives each of the masked testing images as the input image.

A third aspect of the present invention is to provide a system for classifying plural cells into normal and abnormal cells by a CNN according to the method as set forth in the first or second aspect of the present invention. The system is used for cancer-cell screening and/or precancerous-abnormality screening.

The system comprises one or more computing processors configured to perform the following operations. First, obtain a WSI of a slide that contains a plurality of cells for cancer-cell screening. Before using a CNN to classify the plurality of cells, pre-process the WSI to obtain a plurality of testing images each containing a respective cell selected from the plurality of cells. Obtain a plurality of training images for training the CNN, where an individual training image contains one or more cells each pre-classified to belong to a cell type selected from a set of predetermined cell types. Perform any of the embodiments of the method in accordance with the first or second aspect of the present invention, thereby obtaining a plurality of classification results. Post-process the plurality of classification results to yield TBS grades.

Other aspects of the present invention are disclosed as illustrated by the embodiments hereinafter.

DETAILED DESCRIPTION

As used herein, a training image means an image used for training a CNN, and a testing image means an image processed, or to be processed, by the CNN for classification. Furthermore, herein in the specification and appended claims, it is understood that "an image containing a cell" means that the image contains a sub-image of the cell rather than that the image contains a physical cell.

The present invention is concerned with classification of cells by using a CNN. Important applications of this classification include cancer-cell screening and screening of precancerous abnormalities. However, the present invention is not limited to the applications of cancer-cell screening and precancerous-abnormality screening only. The present invention is usable for other medical and biological applications. Furthermore, it is not limited that the cells involved in this classification are originated from human beings only. The cells may be originated from animals such as horses, or from plants. Hereinafter, the present invention is exemplarily illustrated with reference to an application of the CNN classification for cervical cancer cell screening.

Figure 2:
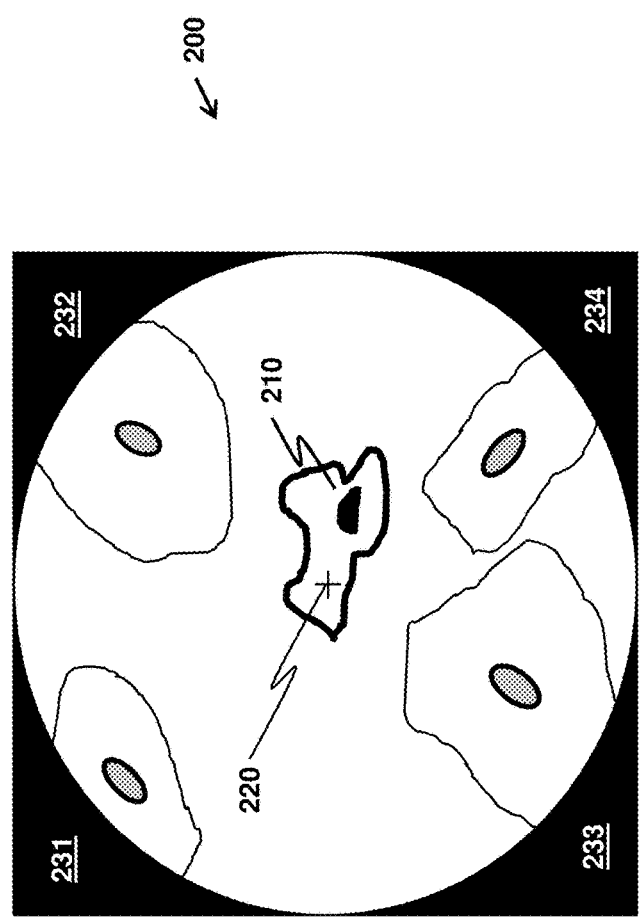
FIG. 2 is a sketch showing a visual image typically observed by a cytotechnologist looking through a microscope to identify an abnormal cell, illustrating that the cytotechnologist usually positions the targeted abnormal cell around the center of the visual image and does not see any object around the four corners of the image.

Training images used for training a CNN for cervical-cancer screening are usually prepared by a human cytotechnologist by searching for abnormal cells deposited on a slide through a microscope followed by imaging an identified abnormal cell. FIG. 2 is a sketch showing a typical visual image containing an abnormal cell as viewed through the microscope by the cytotechnologist. As a human instinct, the cytotechnologist generally positions an abnormal cell of interest 210 around the center 220 of the microscope's image 200. Furthermore, any object in four corners 231-234 of the image 200 is unobservable and is thereby ignored when the cytotechnologist examines the image 200. This observation has inspired the Inventors to use a mask in masking training images before training the CNN. The Inventors have also extended this idea to advantageously-masking testing images to be fed to the CNN for classification.

A first aspect of the present invention is to provide a method performed by one or more computing processors for classifying a plurality of cells by using a CNN.

Figure 3:
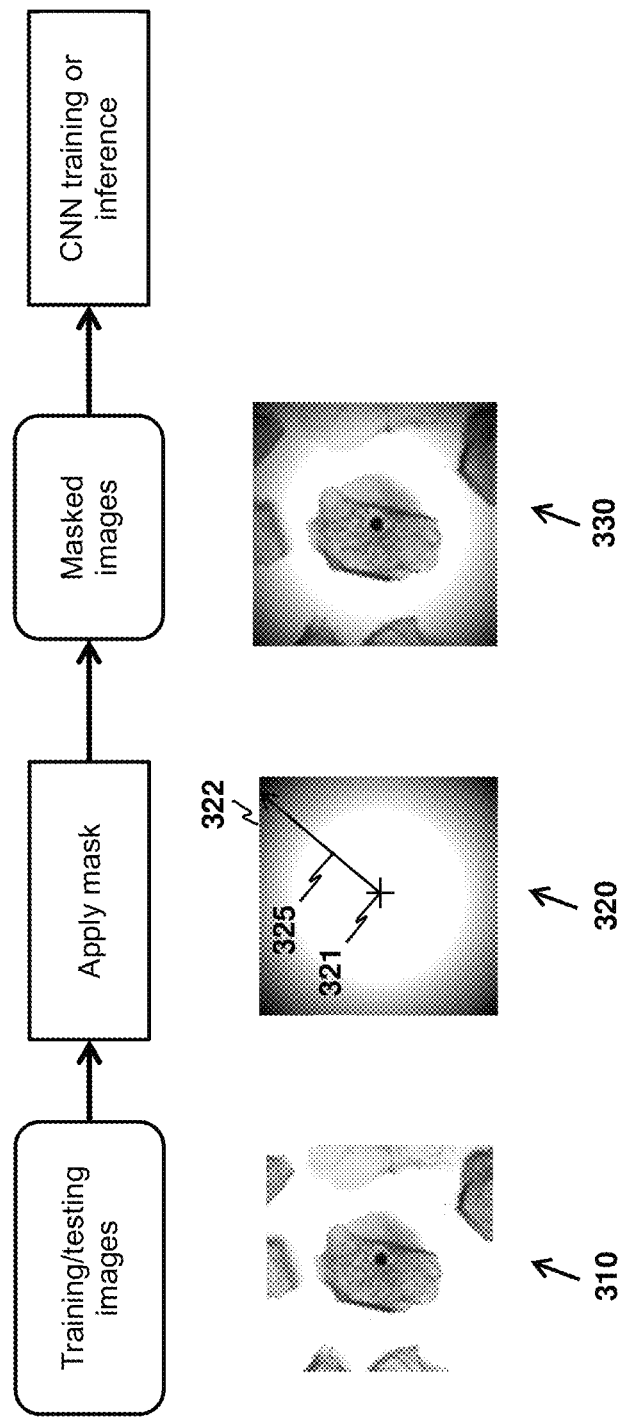
FIG. 3 depicts, in accordance with the present invention, an exemplary process of using a mask to process an input image before CNN processing.

FIG. 3 depicts an exemplary process of using a mask to process an input image 310, which may be a training image or a testing image, in accordance with the present invention. The input image 310 is applied with a mask 320 to form a masked image 330. The mask 320 has a transmittance function used for describing a distribution of degree of transparency over the mask 320. In particular, the mask 320 has the transmittance function that is monotonically decreasing along any straight path (say, a path 325, which forms a straight line on the mask 320) from a center 321 of the mask 320 to a periphery 322 thereof. The transmittance function provides a transmittance value on any location along the path 325. The transmittance is a value showing the transparency of the mask, and is between 0 and 1 inclusively. By choosing a monotonically-decreasing transmittance function, the transmittance at a first location on the path 325 is less than or equal to the transmittance at a second location on the path 325 if the first location is closer to the periphery 322 than the second location is. Furthermore, the transmittance function is chosen such that on the mask 320, the center 321 is more transparent than the periphery 322.

Let $I'_{x,y}$ be the luminance value of a pixel located at a coordinate (x,y) of the masked image 330. Then $I'_{x,y}$ is given by $I'_{x,y}=I_{x,y} \times h_{x,y}$, where $I_{x,y}$ is the luminance value of the pixel at (x,y) of the input image 310, and $h_{x,y}$ is the transmittance value of the mask 320 at (x,y). In case the input image 310 contains multiple color channels such as RGB channels, the transmittance function of the mask 320 is applied to each channel of the input image 310 to yield the masked image 330. Depending on whether the input image 310 is a training image or a testing image, the masked image 330 is processed by the CNN for training or for inference.

Figure 4:
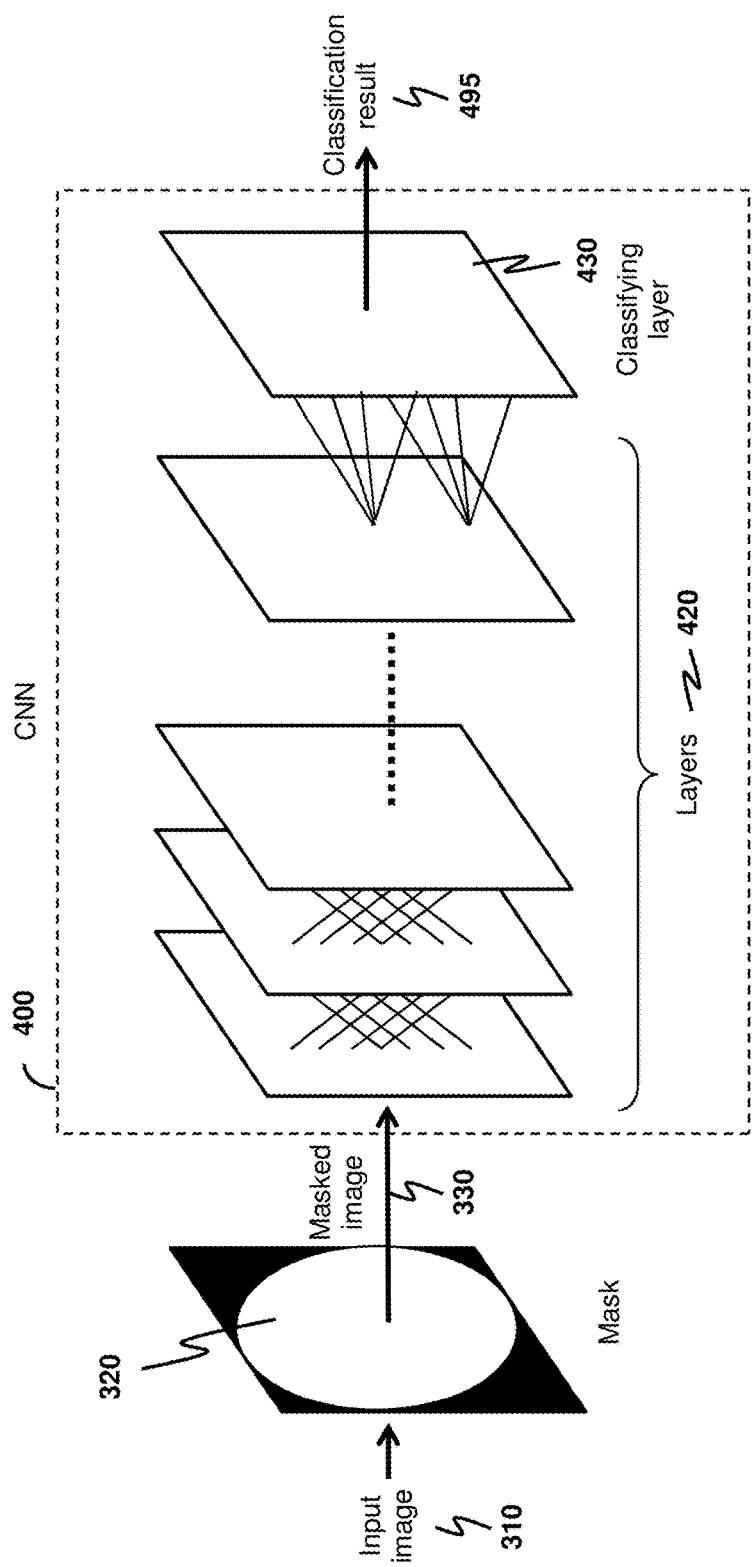
FIG. 4 depicts one typical realization of CNN usable for processing a masked image.

The CNN used for processing the masked image 330 is a conventional CNN. In the art, there are references providing details for CNN implementation, e.g., Y. Lecun et al., "Gradient-based learning applied to document recognition," *IEEE Proceedings*, vol. 86, issue 11, pp. 2278-2324, November 1998, the disclosure of which is incorporated by reference herein. FIG. 4 depicts one typical CNN realization usable for processing the masked image 330. A CNN 400 comprises plural layers 420 for generating plural feature maps based on the masked image 330. Each of the layers 420 may be a convolutional layer, a subsampling layer or a pooling layer. The feature maps are then processed by a classifying layer 430 for producing a classification result 495. If the masked image 330 is generated from a training image, the classification result 495 is compared with a class predetermined for the training image to determine how to update the CNN. In case the masked image 330 is generated from a testing image, the CNN 400 yields the classification result 495 of the testing image.

Figure 5:
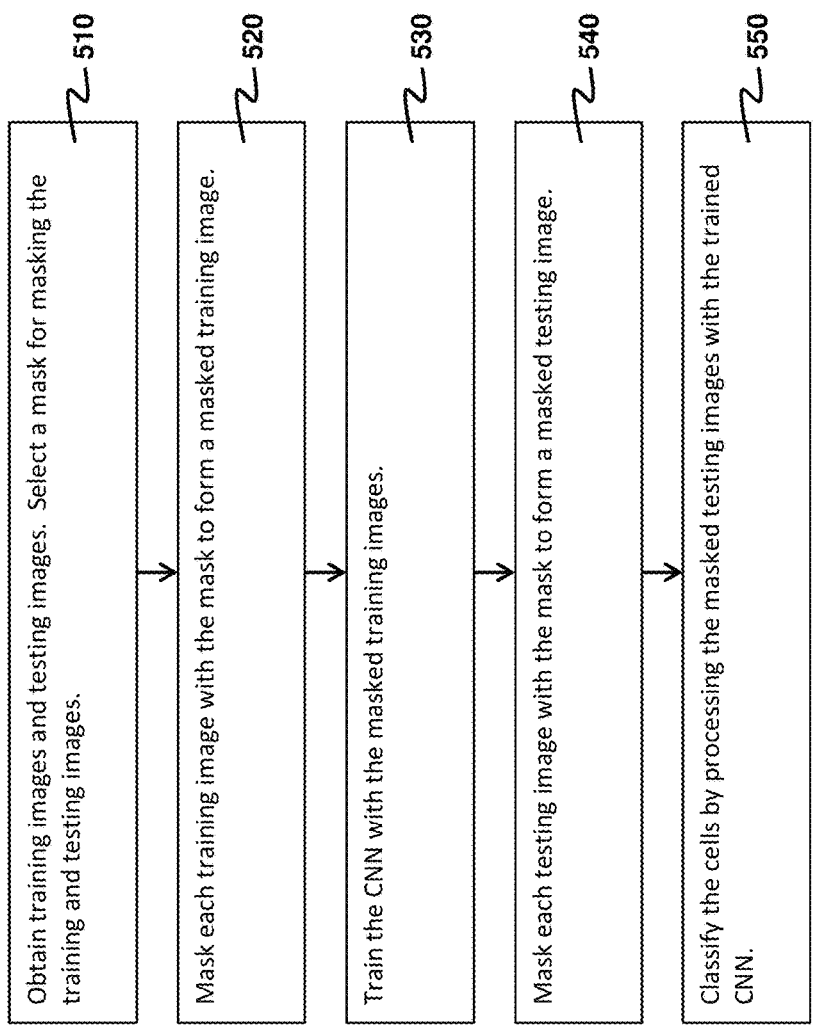
FIG. 5 depicts a processing flow of steps in accordance with one embodiment of a method for classifying cells where an image-end masking approach is used.

The disclosed method for classifying a plurality of cells by using a CNN is exemplarily illustrated with the aid of FIG. 5, which depicts a processing flow of steps according to one embodiment of the method.

In a preparatory step 510, a plurality of training images and a plurality of testing images are obtained. The plurality of training images is used for training the CNN. An individual training image contains one or more cells each pre-classified to belong to a cell type selected from a set of predetermined cell types. Each of the testing images contains a respective cell selected from the plurality of cells.

In case the method is used for cancer-cell screening or precancerous-abnormality screening, the plurality of cells imaged on the plurality of testing images is originally obtained from a body part or an organ of a patient. If it is intended to diagnose the patient for cervical cancer, the organ for obtaining the plurality of cells is the patient's cervix. For cervical-cancer diagnosis, the set of predetermined cell types includes a non-abnormal object and one or more abnormal cells. The one or more abnormal cells may include one or more of the following: LSIL, HSIL, AGC, ASC-US, ASC-H, SCC, AIS and ADC.

Also in the step 510, a mask for masking each of the training and testing images is selected. As mentioned above, the mask has a transmittance function monotonically decreasing from a center of the mask to a periphery thereof such that the center of the mask is more transparent than the periphery thereof.

Figure 1:
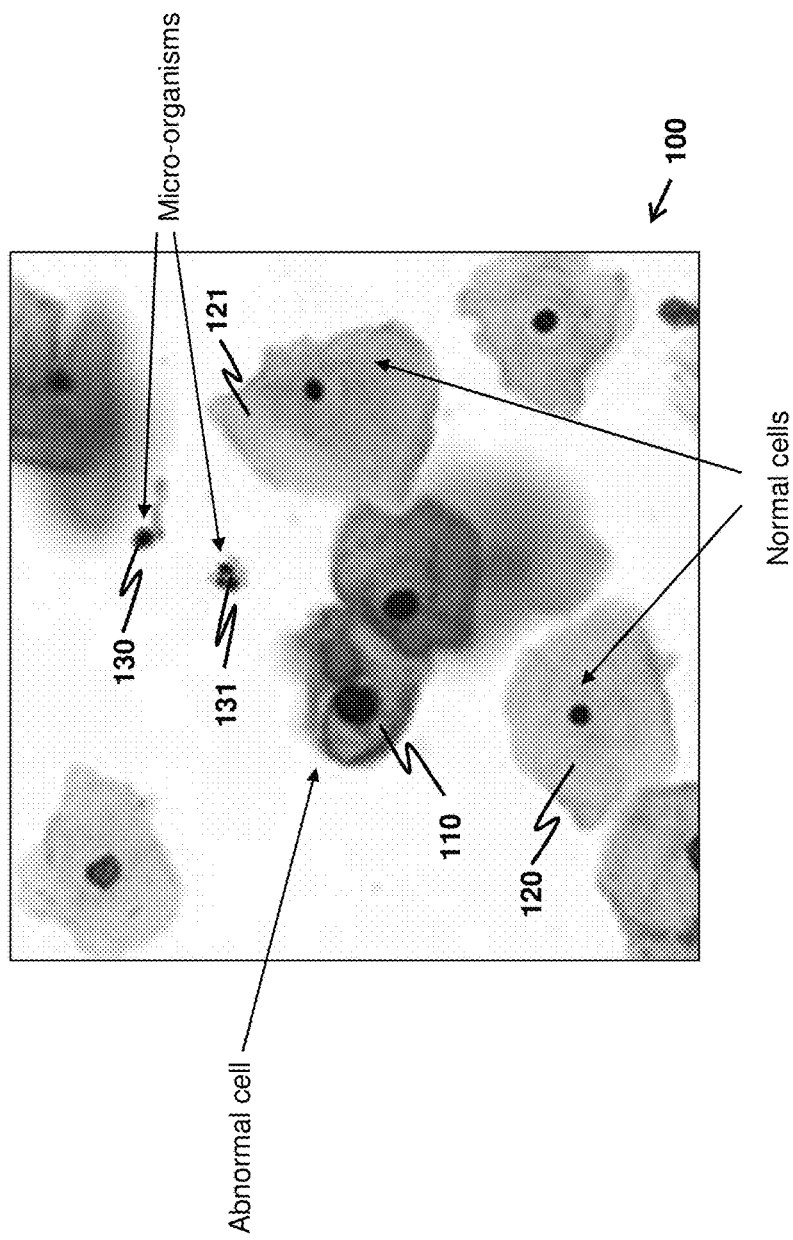
FIG. 1 depicts a real-life adversarial sample as an example image used for training a CNN for cancer-cell identification.

In a step 520, the individual training image is masked with the mask to form an individual masked training image. Thereby, a plurality of masked training images is generated. The plurality of masked training images is used to train the CNN in a step 530. When the pre-classified one or more cells are located around a center of the individual training image for classifying the plurality of cells, and when the individual training image further contains a first plurality of irrelevant objects (such as the normal cells 120, 121 and the microorganisms 130, 131 as depicted in FIG. 1) located around a periphery of the individual training image, interference due to the first plurality of irrelevant objects in training the CNN is advantageously diminished by using the individual masked training image rather than the original individual training image. The reduction of interference allows an improvement to the accuracy in the classification of the plurality of cells.

Irrelevant objects are usually present not only in the plurality of training images but also in the plurality of testing images. Although the mask may be used to mask the individual training image for an improvement in the CNN classification performance, preferably the mask is also used to mask an individual testing image for an additional improvement in classification performance.

In a step 540, the individual testing image is masked with the mask to form an individual masked testing image. A plurality of masked testing images is thereby generated. The step 540 may be performed before or after performing the step 530. After the CNN is trained in the step 530, the plurality of cells is classified in a step 550 according to the set of predetermined cell types by processing the plurality of masked testing images obtained in the step 540 with the trained CNN to yield a plurality of classification results. When the aforesaid respective cell is located around the center of the individual testing image and when the individual testing image further contains a second plurality of irrelevant objects located around a periphery of the individual testing image, the CNN has an advantage that interference due to the second plurality of irrelevant objects in classifying the respective cell is diminished by using the individual masked testing image rather than the original individual testing image.

As one convenient practical choice of the mask, its transmittance function is symmetrical about the center of the mask. Preferably, the transmittance function is circularly symmetrical about the center.

Figure 6:
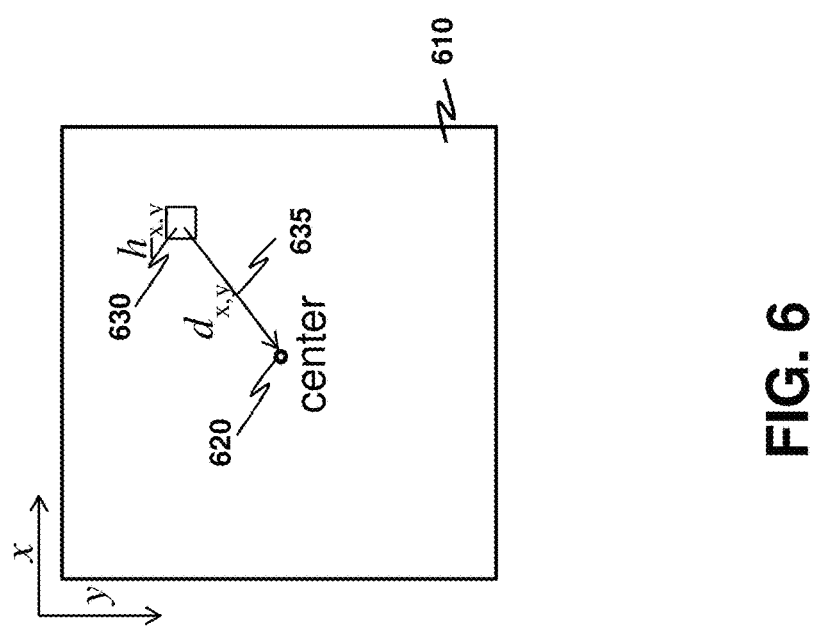
FIG. 6 depicts, for illustrative purpose, a mask having a circularly-symmetric transmittance function.

For illustration, FIG. 6 depicts a mask 610 having a center 620. A location 630 at a coordinate (x,y) on the mask 610 is separated from the center 620 by a distance 635, denoted as $d_{x,y}$. At (x,y), the mask 610 has a transmittance denoted as $h_{x,y}$. If the transmittance function is circularly symmetric about the center 620, the transmittance function is a function of $d_{x,y}$ regardless of individual values of x and y. Denote $h(d_{x,y})$ as a circularly-symmetric transmittance function of $d_{x,y}$.

Figure 7:
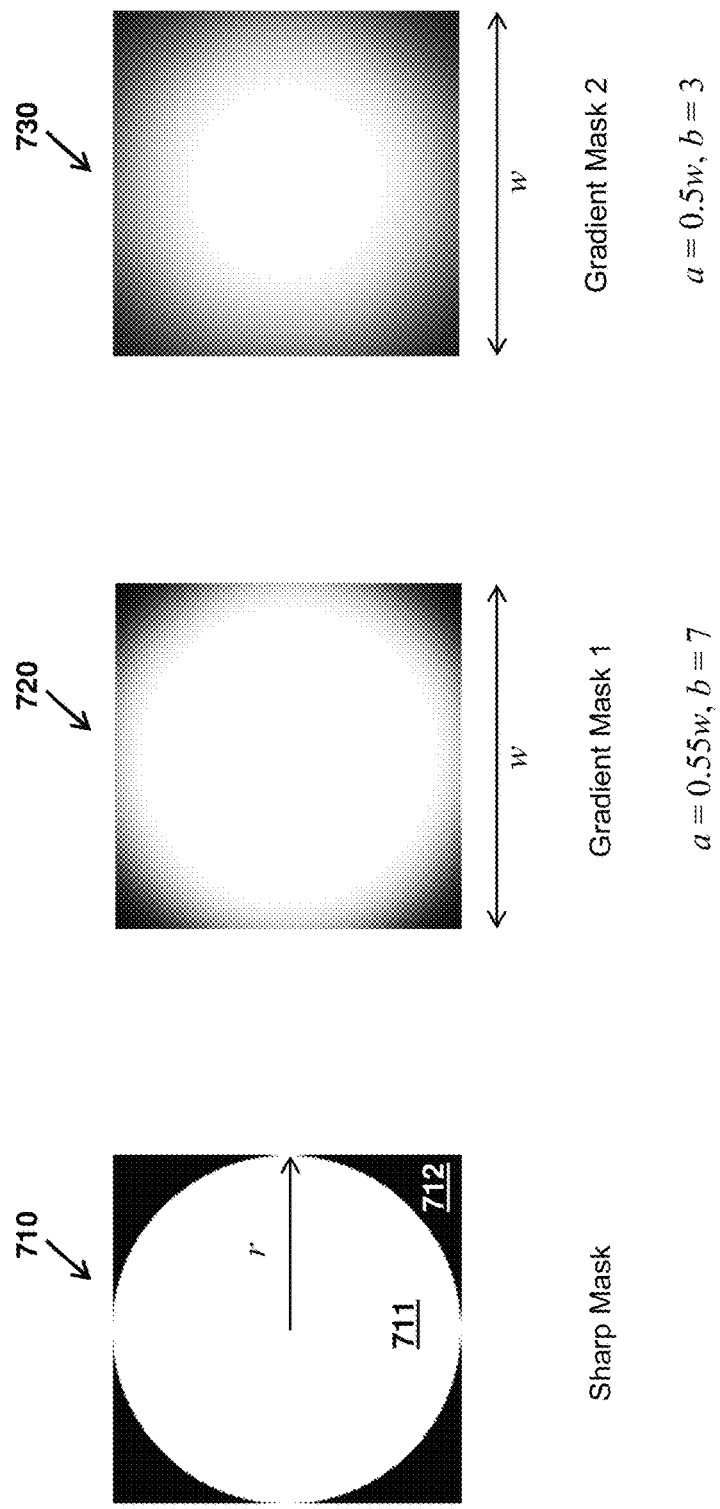
FIG. 7 depicts examples of masks having circularly-symmetric transmittance functions.

FIG. 7 depicts some practical examples of masks having circularly-symmetric transmittance functions. A sharp mask 710 has a circularly-shaped transparent part 711 surrounded by a completely non-transparent part 712. The two parts 711, 712 are distinct and non-overlapping. The transmittance function of the sharp mask 710 is given by $h(d_{x,y})=1$ for $d_{x,y} \leq r$ and $h(d_{x,y})=0$ otherwise, where r is the radius of the circularly-shaped transparent part 711. Alternative to the sharp mask 710, a gradient mask having gradual transition from a transparent part to a completely non-transparent part may be used. In one embodiment, a gradient mask has a transmittance function given by $h(d_{x,y})=1/(1+(d_{x,y}/a)^{2b})$ where a and b are parameters for defining the transmittance function. FIG. 7 depicts two gradient masks, each having a rectangular shape, as examples: a first gradient mask 720 with a=0.55w and b=7, and a second gradient mask 730 with a=0.5w and b=3, where w is a length of a side of each mask.

Experimental results on the CNN classification performance based on the disclosed method were obtained for cases using the sharp mask 710 and the two gradient masks 720, 730. For comparison, the classification performance for the CNN without masking training and testing images was also generated. The following parameters were used in the experiment: 16 predetermined cell types; 26,350 training images; 1,200 testing images; the CNN being implemented in GoogLeNet; and 100,000 iterations in training the CNN. A value of classification accuracy was computed as (TP+TN)/NC where TP, TN and NC denote the number of true positives, the number of true negatives, and the number of samples, respectively. The accuracy values were measured at cell level. Table 1 lists the accuracy values for different cases.

TABLE 1

| Mask used | Classification accuracy |
| --- | --- |
| Nil | 96.5 % |
| Sharp mask 710 | 97.5 % |
| First gradient mask 720 | 98 % |
| Second gradient mask 730 | 99 % |

The experimental results in Table 1 indicate that using a mask improves the classification accuracy in comparison of not using a mask. In practical situations, a slide prepared with cells of one patient usually has more than 10,000 cells. If the classification accuracy is improved by 1%, the number of incorrectly classified cells can be reduced by 100, thus substantially affecting the diagnostic result. By using the mask in the disclosed method, an accuracy improvement of more than 1% is achievable. In particular, a 2.5% improvement is obtained by using the second gradient mask 730. The aforementioned findings demonstrate the usefulness of the disclosed method.

In the method set forth in the first aspect of the present invention, masking is applied directly to the training and testing images. Different from this image-end approach of masking, which precedes CNN processing, it is possible to apply masking to feature maps generated from an input image after the CNN partially processes the input image.

A second aspect of the present invention is to provide a method performed by one or more computing processors for classifying a plurality of cells by using a CNN based on a feature-end approach of masking.

Figure 8:
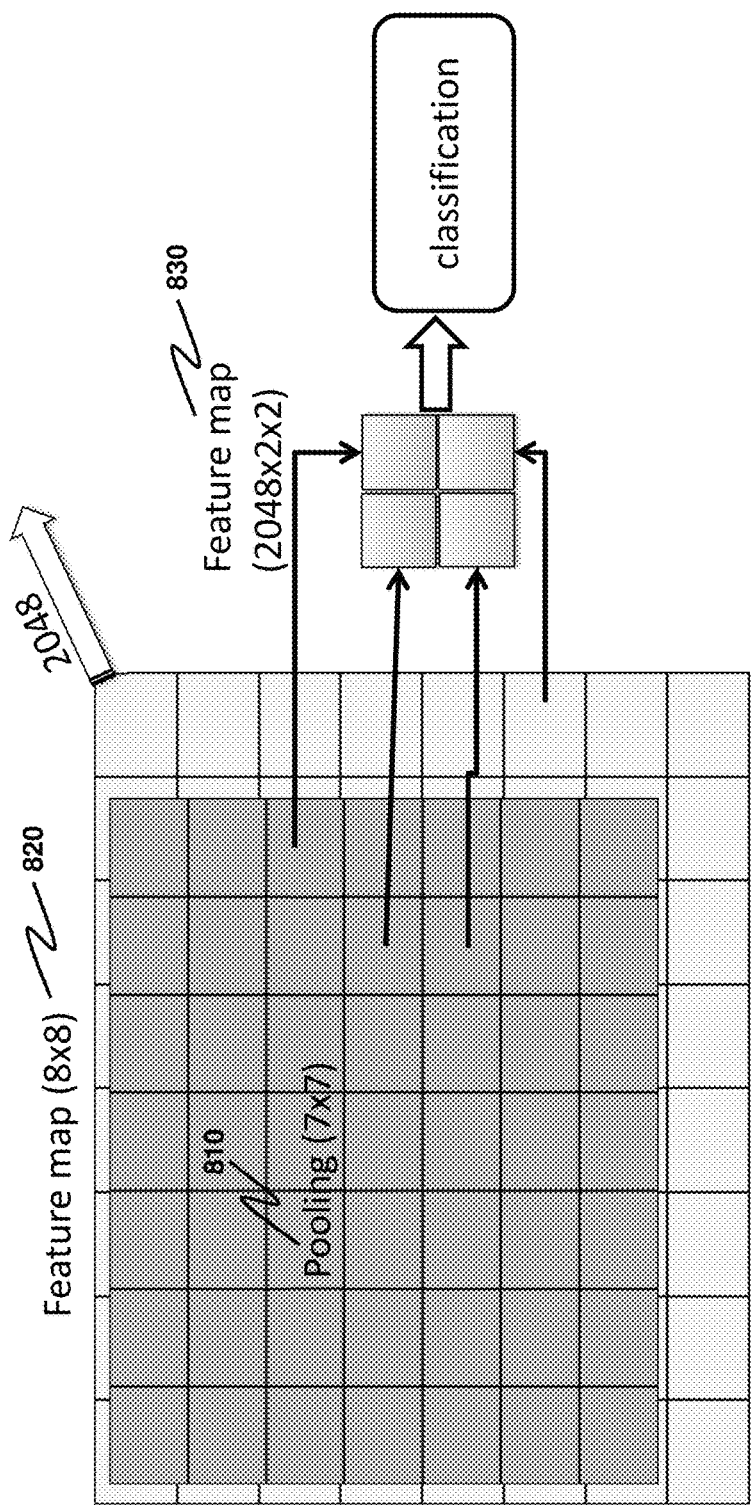
FIG. 8 depicts an example illustrating a pooling operation performed in a CNN.

Before detailing the feature-end masking approach, consider a conventional CNN. In the conventional CNN, a pooling layer is used to combine outputs of neurons clustered in a previous layer into an output of a single neuron in the pooling layer. FIG. 8 depicts an example illustrating a pooling operation. In the example, assume that 2048 feature maps 820 each of size 8×8 are generated from a previous layer. The pooling operation is performed by performing convolution of each of the feature maps 820 with a pooling mask 810 of size, say, 7×7. As a result, 2048 feature maps 830 each of reduced size 2×2 are generated.

Figure 9:
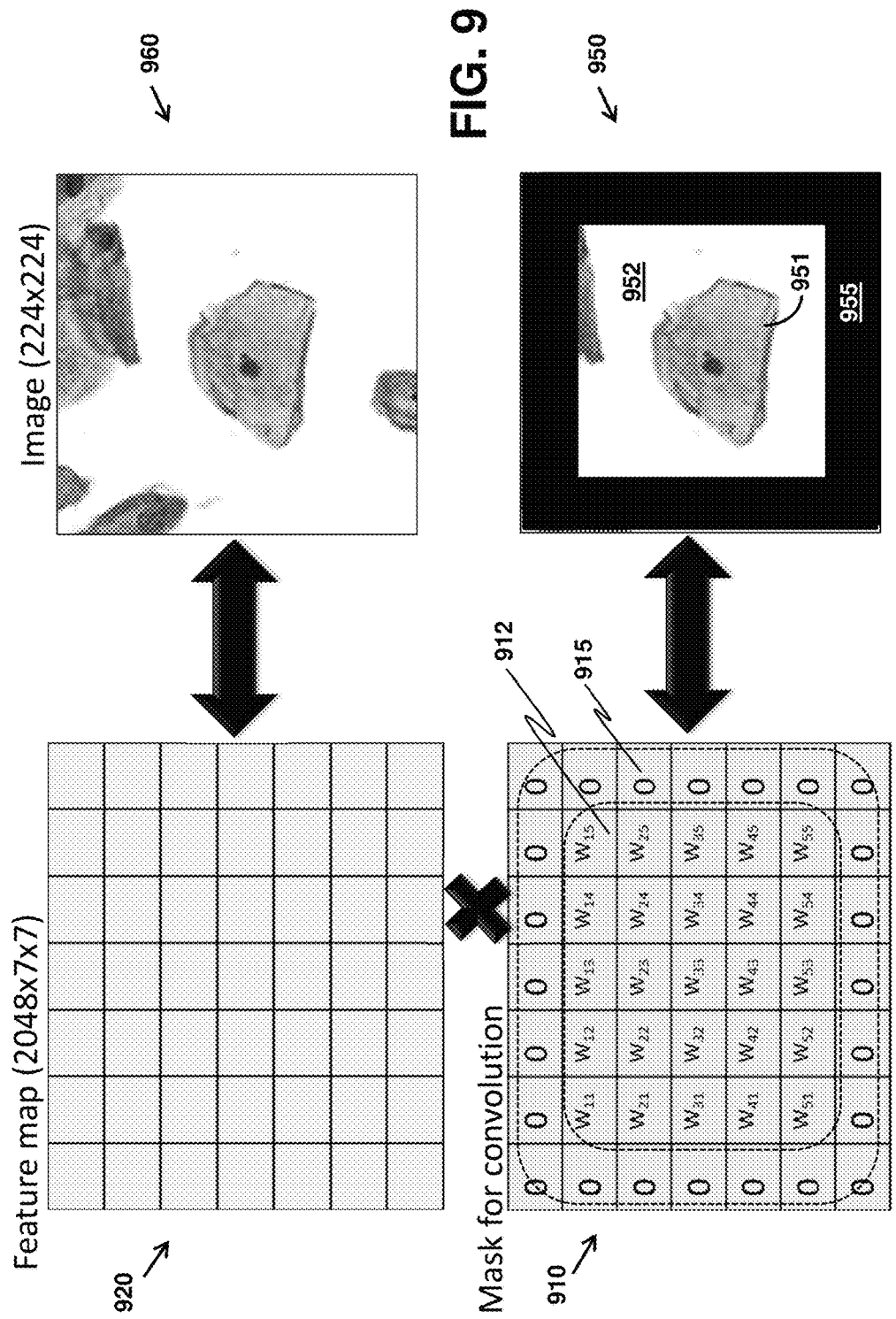
FIG. 9 provides a conceptual illustration of masking feature maps.

In the feature-end masking approach, a convolutional masking layer is used instead of the pooling layer in generating feature maps of reduced size. FIG. 9 provides a conceptual illustration of the feature-end approach of masking. A mask 910 is used to convolve with each of the 2048 feature maps 820. The mask 910 is set to have a size 7×7, same as the size of the pooling mask 810, in the example shown in FIG. 9. The mask 910 specifically has an all-zero outermost region 915 and a non-zero convolutional kernel 912. The outermost region 915 has a uniform width in pixel. The convolutional kernel 912 is surrounded by the outermost region 915. In the example shown in FIG. 9, the width of the outermost region 915 is 1 pixel, whereby the convolutional kernel 912 has a size 5×5. For illustration, FIG. 9 shows a feature map 920 to be multiplied with the mask 910. In the example, the feature map 920 is transformed from an image 960 of size 224×224 by CNN layers. The image 960 is intended for inference. Multiplying the mask 910 with the feature map 920 gives a masked feature map. The masked feature map is equivalent to a transformation result of an equivalent inference image 950. Notably, the equivalent inference image 950 has a blackened peripheral region 955 surrounded by a central region 952. The central region 952 contains a cell of interest 951. By using the mask 910, the cell of interest 951 is highlighted whereas objects that produce interference in inference and that reside in the blackened peripheral region 955 are advantageously removed.

Figure 10:
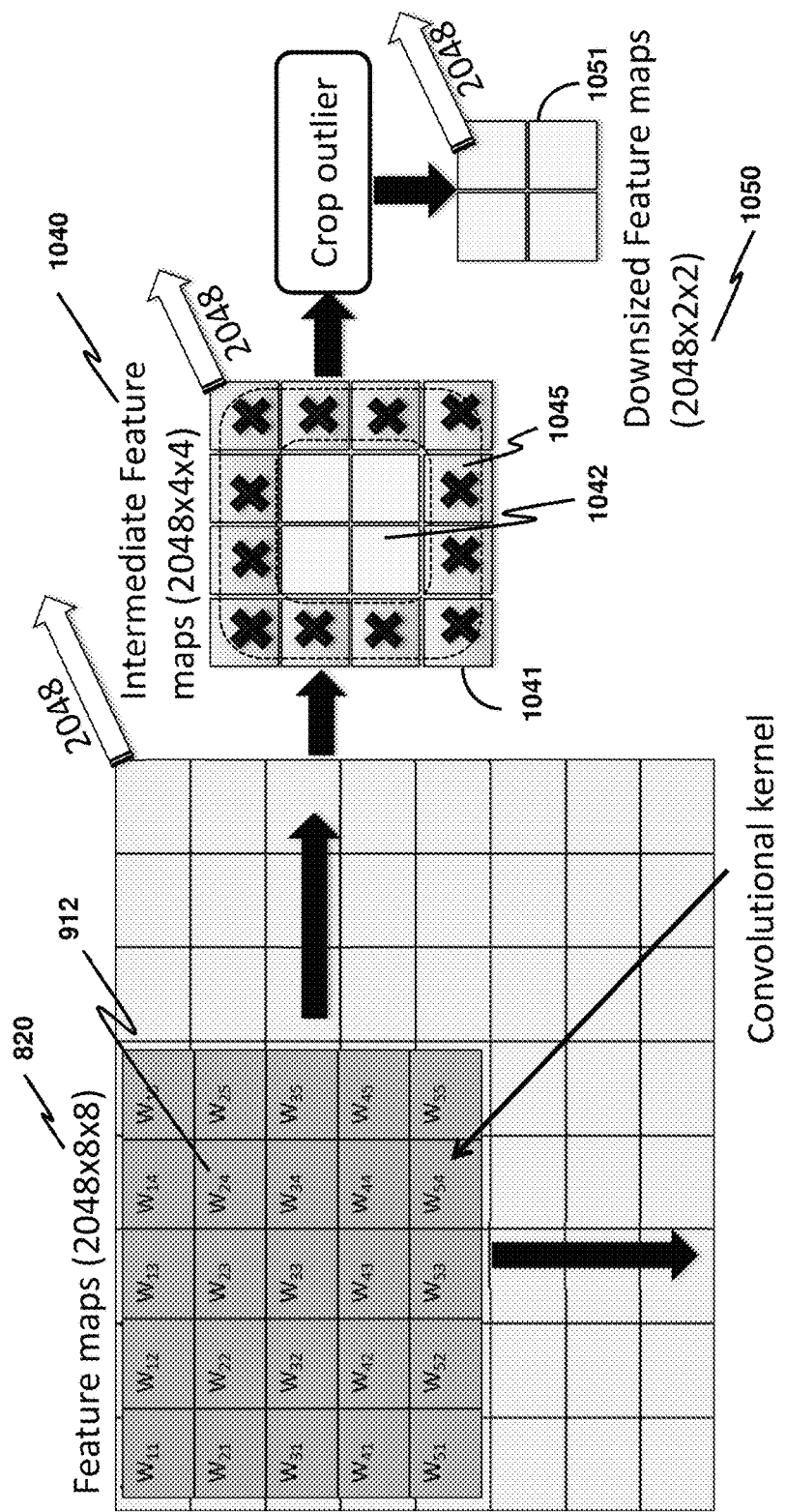
FIG. 10 depicts one practical realization of masking the feature maps.

FIG. 10 depicts one practical realization of using the mask 910 for convolution with each of the feature maps 820. The convolution kernel 912 (of size 5×5) alone is used to convolve with each of the 2048 feature maps 820 first to yield 2048 intermediate feature maps 1040 each of size 4×4. Each intermediate feature map, referenced as 1041, has a central region 1042 and a peripheral region 1045, where the peripheral region 1045 surrounds the central region 1042. The peripheral region 1045 has a uniform width of 1 pixel, the same as the width of the outermost region 915 of the mask 910. It follows that the central region 1042 has a size 2×2. The peripheral region 1045 of each intermediate feature map 1041 is chopped off to leave the central region 1042, which forms one downsized feature map 1051 of size 2×2. The process of convolution and chopping is individually applied to all of the 2048 feature maps 820. As a result, 2048 downsized feature maps 1050 are obtained.

Figure 11:
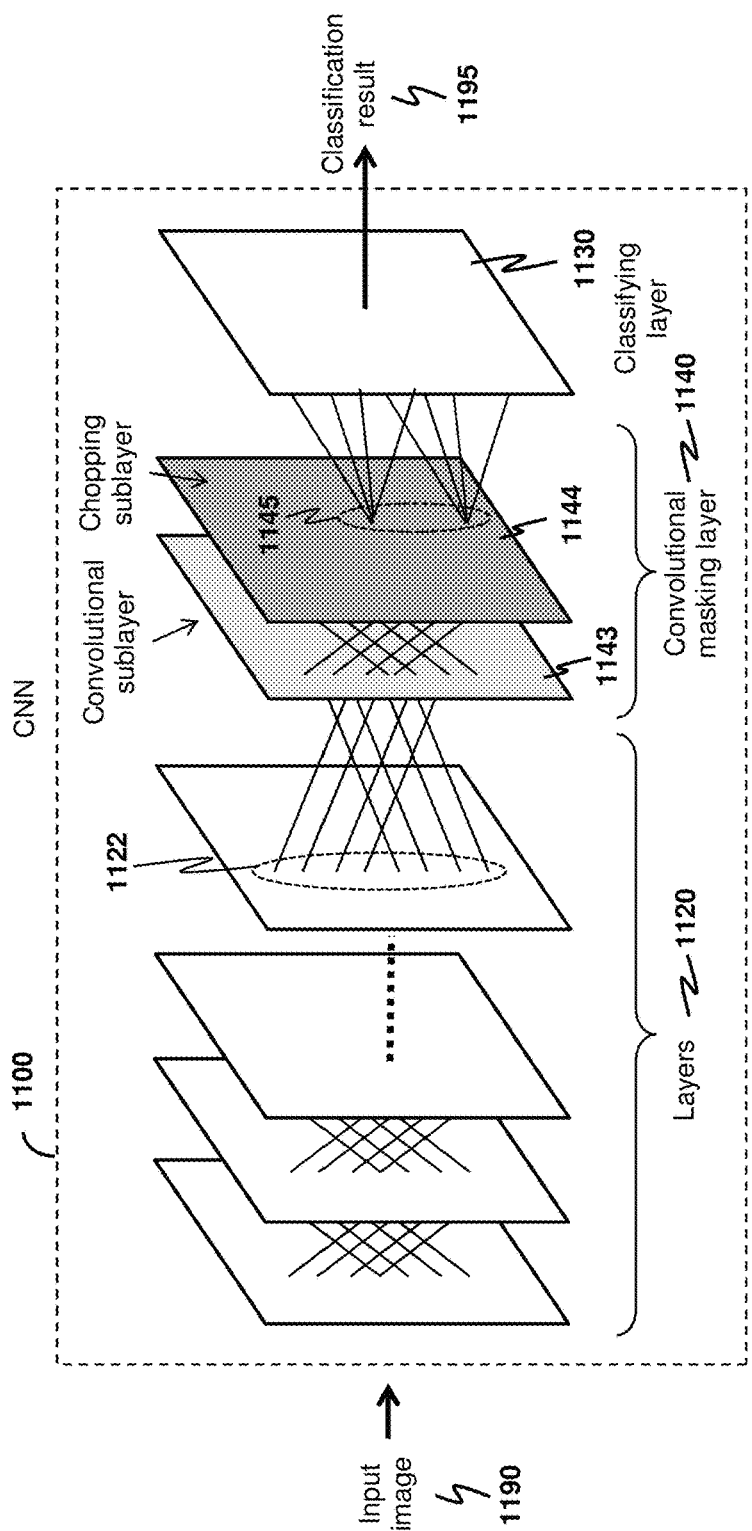
FIG. 11 is a schematic diagram of an exemplary CNN that uses a feature-end masking approach.

An exemplary CNN that incorporates operation details as described above for FIGS. 9 and 10 is given in FIG. 11, which depicts a schematic diagram of a CNN 1100 that employs the feature-end masking approach. The CNN 1100 comprises a plurality of layers 1120 for generating plural feature maps based on an input image 1190 received by the CNN 1100. The feature maps are obtained at outputs 1122 of the plurality of layers 1120. The CNN 1100 further comprises a convolutional masking layer 1140 for convolving a mask with each of the feature maps so as to generate plural downsized feature maps. The mask (such as the mask 910) has an all-zero outermost region and a non-zero convolutional kernel. The outermost region has a uniform width in pixel. The downsized feature maps are obtained at outputs 1145 of the convolutional masking layer 1140. In the CNN 1100, a classifying layer 1130 is used for generating a classification result 1195 according to the downsized feature maps.

Preferably, the convolutional masking layer 1140 comprises a convolutional sublayer 1143 and a chopping sublayer 1144. The convolutional sublayer 1143 is used to receive the feature maps from the plurality of layers 1120, and to convolve each of the feature maps with the convolutional kernel so as to generate plural intermediate feature maps. The intermediate feature maps are further processed by the chopping sublayer 1144. The chopping sublayer 1144 is used to chop off a peripheral region of each of the intermediate feature maps to yield a respective downsized feature map. The peripheral region has a uniform width equal to the width of the mask's outermost region.

It is noted that a mask for masking features is also used in a CNN disclosed by E. Teng et al., "ClickBAIT: Click-based Accelerated Incremental Training of Convolutional Neural Networks," arXiv: 1709.05021v1, [cs.CV], Sep. 15, 2017 (Cornell University Library). However, the CNN of E. Teng et al. is different from the CNN 1100 of the present invention in the following aspects. In the CNN of E. Teng et al., after the features are masked, a general pooling layer is used to condense the features. It is different from the CNN 1100 of the present invention, where the convolutional masking layer 1140, in which masking the feature maps is done, is used to replace the pooling layer in a conventional CNN. The CNN 1100 does not contain a pooling layer subsequent to the convolutional masking layer 1140. Furthermore, the masking operation of the CNN of E. Teng et al. is an element-wise multiplication operation. In the CNN 1100, the corresponding masking operation is a convolution operation followed by a chopping operation. In addition, user inputs are required to specify where to apply the mask in the CNN of E. Teng et al. whereas no user input for specifying the mask location is required for the CNN 1100.

Figure 12:
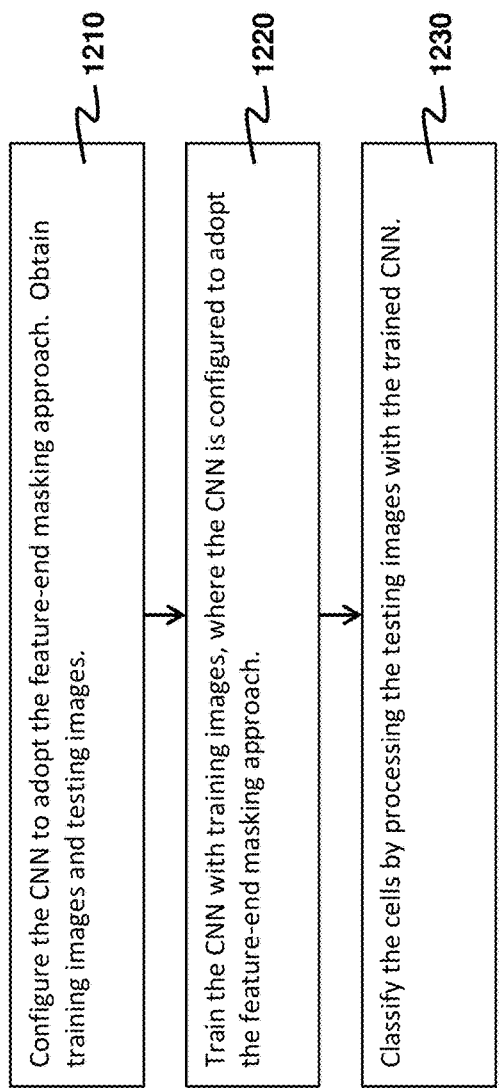
FIG. 12 depicts a processing flow of steps in accordance with another embodiment of a method for classifying cells where the feature-end masking approach is used.

By using the CNN 1100, the method for classifying the plurality of cells based on the feature-end masking approach is exemplarily illustrated with reference to the steps shown in FIG. 12.

In a preparatory step 1210, a plurality of training images and a plurality of testing images are obtained. The plurality of training images is used for training the CNN 1100, which is configured to adopt the feature-end masking approach. An individual training image contains one or more cells each pre-classified to belong to a cell type selected from a set of predetermined cell types. Each of the testing images contains a respective cell selected from the plurality of cells.

In case the method is used for cancer-cell screening or precancerous-abnormality screening, the plurality of cells imaged on the plurality of testing images is originally obtained from a body part or an organ of a patient. If it is intended to diagnose the patient for cervical cancer, the organ for obtaining the plurality of cells is the patient's cervix. For cervical-cancer diagnosis, the set of predetermined cell types includes a non-abnormal object and one or more abnormal cells. The one or more abnormal cells may include one or more of the following: LSIL, HSIL, AGC, ASC-US, ASC-H, SCC, AIS and ADC.

In a step 1220, the CNN 1100 is trained with the plurality of training images. The CNN 1100 receives each of the training images as the input image 1190. After the CNN 1100 is trained, the plurality of cells is classified in a step 1230 according to the set of predetermined cell types by processing the plurality of testing images with the CNN 1100 to yield the classification result 1195, where the CNN 1100 receives each of the testing images as the input image 1190.

Table 2 lists values of classification accuracy as obtained in an experiment. In the experiment, the CNN 1100 was separately realized as GoogLeNet and ResNet-50. A conventional CNN without using the feature-end masking approach was also used in the experiment for comparison.

TABLE 2

| CNN | Classification accuracy (GoogLeNet) | Classification accuracy (ResNet-50) |
| --- | --- | --- |
| Conventional CNN | 80% | 54% |
| CNN 1100 | 94% | 94% |

Results of Table 2 demonstrate a significant improvement in classification performance by using the feature-end masking approach.

It is desirable to compare the image-end masking approach and the feature-end masking approach in the impact to implementation. First, pre-processing of the training and testing images is required to generate masked images in the image-end masking approach whereas pre-processing is not mandatory for the feature-end masking approach. Second, the mask 320 used in the image-end masking approach usually has a higher resolution that the mask 910 used in the other approach. Third, for the image-end masking approach, it is required that the classifying layer 430 of the CNN 400 is implemented as a fully connected layer. Thus, the CNN 400 is a fully connected network. For the feature-end masking approach, on the other hand, the classifying layer 1130 of the CNN 1100 may be a fully connected layer or a fully convolutional layer. Hence, the CNN 1100 can be a fully connected network or a fully convolutional network. If the CNN 1100 is implemented as the fully convolutional network, an inference speed-up can be advantageously obtained over using the CNN 400, which is implemented as the fully connected network.

A third aspect of the present invention is to provide a system for classifying plural cells into normal and abnormal cells by a CNN according to the method disclosed above as set forth in the first or second aspect of the present invention. The system is used for cancer-cell screening and/or precancerous-abnormality screening.

Figure 13:
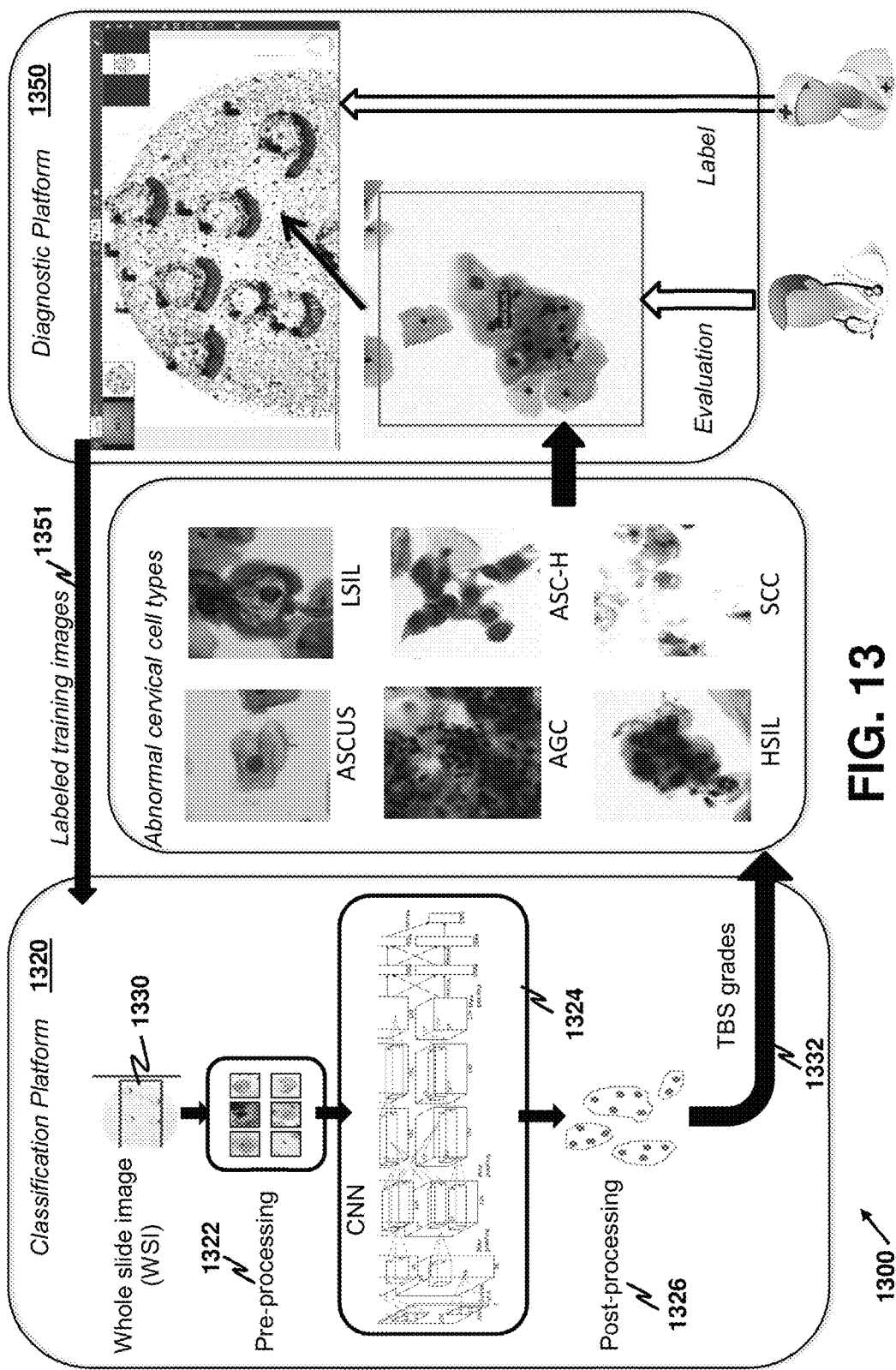
FIG. 13 depicts a schematic structure of an exemplary system for cancer-cell screening and/or precancerous-abnormality screening.

Exemplarily, the system is illustrated with the aid of FIG. 13, which depicts a schematic structure of a system 1300 designed for diagnosing cervical cancer and detecting precancerous abnormalities appeared in a cervix. The system 1300 comprises a diagnostic platform 1350 and a classification platform 1320.

The diagnostic platform 1350 is a first computing subsystem that interacts with medical practitioners and allows the medical practitioners to classify and label a (limited) number of cells for CNN training. As a result, labeled training images 1351 are obtained and sent to the classification platform 1320.

The classification platform 1320 is a second computing subsystem used for classifying the cells into normal and abnormal cells. The computing subsystem is realizable by one or more computing processors.

The classification platform 1320 first obtains a WSI 1330 of a slide that contains a plurality of cells for cancer-cell screening or precancerous-abnormality screening.

Pre-processing 1322 of the WSI 1330 is performed. Usually, the pre-processing 1322 includes segmenting the WSI 1330 into a plurality of testing images. Details of the pre-processing 1322 are available in the art, e.g., in CN103984958.

A CNN 1324, which is chosen from the above-disclosed CNNs 400, 1100, is used to process the plurality of testing images after the CNN 1324 is trained with the labeled training images 1351. The CNN 1324 yields a plurality of classification results.

If the CNN 400 is selected as the CNN 1324, the pre-processing 1322 further includes masking each of the testing images and the labeled training images 1351 with a mask (e.g., the mask 710).

Post-processing 1326 of the plurality of classification results is carried out to yield TBS grades 1332. TBS is a system commonly used for reporting Pap smear results in cervical or vaginal cytologic diagnoses. For details of TBS and TBS grades, see, e.g., R. Nayar and D. C. Wilbur, *The Bethesda System for Reporting Cervical Cytology*, Springer, 2015.

Each of the first and second computing systems mentioned above may be realized by general-purpose computers, specialized computers, computing servers, one or more computing processors with data storing devices, etc. The aforesaid computing processors may be general-purpose processors or specialized processors, e.g., processors specially designed for CNN realization.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method performed by one or more computing processors for classifying a plurality of cells by using a convolutional neural network (CNN), the method comprising:
    obtaining a plurality of training images for training the CNN, wherein an individual training image contains one or more cells each pre-classified to belong to a cell type selected from a set of predetermined cell types;
    masking the individual training image with a mask to form an individual masked training image so as to generate a plurality of masked training images, wherein the mask has a transmittance function monotonically decreasing from a center of the mask to a periphery thereof such that the center of the mask is more transparent than the periphery thereof; and
    training the CNN with the plurality of masked training images, whereby when the pre-classified one or more cells are located around a center of the individual training image and the individual training image further contains a first plurality of irrelevant objects located around a periphery of the individual training image, interference due to the first plurality of irrelevant objects in training the CNN for classifying the plurality of cells is diminished by using the individual masked training image rather than the original individual training image.

2. The method of claim 1 further comprising:
    obtaining a plurality of testing images each containing a respective cell selected from the plurality of cells;
    masking an individual testing image with the mask to form an individual masked testing image so as to generate a plurality of masked testing images; and
    classifying the plurality of cells according to the set of predetermined cell types by processing the plurality of masked testing images with the CNN after training, whereby when the respective cell is located around the center of the individual testing image and the individual testing image further contains a second plurality of irrelevant objects located around a periphery of the individual testing image, interference due to the second plurality of irrelevant objects in classifying the respective cell is diminished by using the individual masked testing image rather than the original individual testing image.

3. The method of claim 1, wherein the transmittance function is symmetrical about the center of the mask.

4. The method of claim 1, wherein the transmittance function is circularly-symmetrical and is given by $h(d_{x,y})=1$ for $d_{x,y} \leq r$ and $h(d_{x,y})=0$ otherwise, where $h(d_{x,y})$ is a transmittance value at a coordinate (x,y) of the mask, $d_{x,y}$ is a distance between (x,y) and the center of the mask, and r is a radius of a circularly-shaped transparent part of the mask.

5. The method of claim 1, wherein the transmittance function is circularly-symmetrical and is given by $h(d_{x,y})=1/(1+(d_{x,y}/a)^{2b})$ where $h(d_{x,y})$ is a transmittance value at a coordinate (x,y) of the mask, $d_{x,y}$ is a distance between (x,y) and the center of the mask, and a and b are parameters for defining the transmittance function.

6. The method of claim 1, wherein the plurality of cells imaged on the plurality of testing images is originally obtained for cancer-cell screening or precancerous-abnormality screening.

7. The method of claim 1, wherein the plurality of cells imaged on the plurality of testing images is originally obtained from a cervix of a patient for cancer-cell screening or precancerous-abnormality screening.

8. The method of claim 7, wherein the set of predetermined cell types comprises a non-abnormal object and one or more abnormal cells, the one or more abnormal cells including one or more of low-grade squamous intraepithelial (LSIL), high-grade squamous intraepithelial (HSIL), atypical glandular cell (AGC), atypical squamous cell of undetermined significance (ASC-US), atypical squamous cell-cannot exclude HSIL (ASC-H), squamous cell carcinoma (SCC), adenocarcinoma in-situ (AIS) and adenocarcinoma endocervical (ADC).

9. A method performed by one or more computing processors for classifying a plurality of cells by using a convolutional neural network (CNN), the method comprising:
    configuring the CNN to include:
        a plurality of layers for generating plural feature maps based on an input image received by the CNN;
        a convolutional masking layer for convolving a mask with each of the feature maps so as to generate plural downsized feature maps, wherein the mask has an all-zero outermost region and a non-zero convolutional kernel, the outermost region having a uniform width in pixel; and
        a classifying layer for generating a classification result according to the downsized feature maps;
    obtaining a plurality of training images for training the CNN, wherein an individual training image contains one or more cells each pre-classified to belong to a cell type selected from a set of predetermined cell types;
    obtaining a plurality of testing images each containing a respective cell selected from the plurality of cells;
    training the CNN with the plurality of training images, wherein the CNN receives each of the training images as the input image; and
    classifying the plurality of cells according to the set of predetermined cell types by processing the plurality of testing images with the CNN after training, wherein the CNN receives each of the testing images as the input image.

10. The method of claim 9, wherein the convolutional masking layer comprises:
    a convolutional sublayer for convolving the convolutional kernel with each of the feature maps so as to generate plural intermediate feature maps; and
    a chopping sublayer for chopping off a peripheral region of each of the intermediate feature maps to yield a respective downsized feature map, wherein the peripheral region has a uniform width equal to the width of the mask's outermost region.

11. The method of claim 9, wherein the width of the outermost region is one pixel.

12. The method of claim 9, wherein the plurality of cells imaged on the plurality of testing images is originally obtained for cancer-cell screening or precancerous-abnormality screening.

13. The method of claim 9, wherein the plurality of cells imaged on the plurality of testing images is originally obtained from a cervix of a patient for cancer-cell screening or precancerous-abnormality screening.

14. The method of claim 13, wherein the set of predetermined cell types comprises a non-abnormal object and one or more abnormal cells, the one or more abnormal cells including one or more of low-grade squamous intraepithelial (LSIL), high-grade squamous intraepithelial (HSIL), atypical glandular cell (AGC), atypical squamous cell of undetermined significance (ASC-US), atypical squamous cell-cannot exclude HSIL (ASC-H), squamous cell carcinoma (SCC), adenocarcinoma in-situ (AIS) and adenocarcinoma endocervical (ADC).

15. The method of claim 9, wherein the CNN is further configured to be a fully connected network.

16. The method of claim 9, wherein the CNN is further configured to be a fully convolutional network.

17. A system comprising one or more computing processors configured to:
   obtain a whole slide image (WSI) of a slide that contains a plurality of cells for cancer-cell screening or precancerous-abnormality screening;
   before using a convolutional neural network (CNN) to classify the plurality of cells, pre-process the WSI to obtain a plurality of testing images each containing a respective cell selected from the plurality of cells;
   obtain a plurality of training images for training the CNN, wherein an individual training image contains one or more cells each pre-classified to belong to a cell type selected from a set of predetermined cell types;
   mask the individual training image with a mask to form an individual masked training image so as to generate a plurality of masked training images, wherein the mask has a transmittance function monotonically decreasing from a center of the mask to a periphery thereof such that the center of the mask is more transparent than the periphery thereof;
   train the CNN with the plurality of masked training images, whereby when the pre-classified one or more cells are located around a center of the individual training image and the individual training image further contains a first plurality of irrelevant objects located around a periphery of the individual training image, interference due to the first plurality of irrelevant objects in training the CNN for classifying the plurality of cells is diminished by using the individual masked training image rather than the individual training image;
   mask an individual testing image with the mask to form an individual masked testing image so as to generate a plurality of masked testing images;
   classify the plurality of cells according to the set of predetermined cell types by processing the plurality of masked testing images with the trained CNN to yield a plurality of classification results, whereby when the respective cell is located around the center of the individual testing image and the individual testing image further contains a second plurality of irrelevant objects located around a periphery of the individual testing image, interference due to the second plurality of irrelevant objects in classifying the respective cell is diminished by using the individual masked testing image rather than the individual testing image; and
   post-process the plurality of classification results to yield the Bethesda system (TBS) grades.

18. The system of claim 17, wherein the set of predetermined cell types comprises a non-abnormal object and one or more abnormal cells, the one or more abnormal cells including one or more of low-grade squamous intraepithelial (LSIL), high-grade squamous intraepithelial (HSIL), atypical glandular cell (AGC), atypical squamous cell of undetermined significance (ASC-US), atypical squamous cell-cannot exclude HSIL (ASC-H), squamous cell carcinoma (SCC), adenocarcinoma in-situ (AIS) and adenocarcinoma endocervical (ADC).

19. A system comprising one or more computing processors configured to:
   obtain a whole slide image (WSI) of a slide that contains a plurality of cells for cancer-cell screening or precancerous-abnormality screening;
   before using a convolutional neural network (CNN) to classify the plurality of cells, pre-process the WSI to obtain a plurality of testing images each containing a respective cell selected from the plurality of cells;
   obtain a plurality of training images for training the CNN, wherein an individual training image contains one or more cells each pre-classified to belong to a cell type selected from a set of predetermined cell types;
   before training the CNN, configure the CNN to include:
      a plurality of layers for generating plural feature maps based on an input image received by the CNN;
      a convolutional masking layer for convolving a mask with each of the feature maps so as to generate plural downsized feature maps, wherein the mask has an all-zero outermost region and a non-zero convolutional kernel, the outermost region having a uniform width in pixel; and
      a classifying layer for generating a classification result according to the downsized feature maps;
   train the CNN with the plurality of training images, wherein the CNN receives each of the training images as the input image;
   classify the plurality of cells according to the set of predetermined cell types by processing the plurality of testing images with the trained CNN to yield a plurality of classification results, wherein the CNN receives each of the testing images as the input image; and
   post-process the plurality of classification results to yield the Bethesda system (TBS) grades.

20. The system of claim 19, wherein the set of predetermined cell types comprises a non-abnormal object and one or more abnormal cells, the one or more abnormal cells including one or more of low-grade squamous intraepithelial (LSIL), high-grade squamous intraepithelial (HSIL), atypical glandular cell (AGC), atypical squamous cell of undetermined significance (ASC-US), atypical squamous cell-cannot exclude HSIL (ASC-H), squamous cell carcinoma (SCC), adenocarcinoma in-situ (AIS) and adenocarcinoma endocervical (ADC).

* * * * *